United States Patent
Kim et al.

(10) Patent No.: US 10,745,547 B2
(45) Date of Patent: Aug. 18, 2020

(54) POLYPROPYLENE COMPOSITE RESIN COMPOSITION HAVING EXCELLENT SCRATCH RESISTANCE AND MECHANICAL PROPERTIES

(71) Applicants: HYUNDAI MOTOR COMPANY, Seoul (KR); KIA MOTORS CORPORATION, Seoul (KR); DAE HA CO., LTD., Dangjin-si, Chungcheongnam-do (KR)

(72) Inventors: Hak Soo Kim, Yongin-si (KR); Han Ki Lee, Seoul (KR); Mun Gyu Bak, Seoul (KR); Wan Ho Son, Seosan-si (KR); Jae Hyun Choi, Dangjin-si (KR)

(73) Assignees: Hyundai Motor Company, Seoul (KR); Kia Motors Corporation, Seoul (KR); DAE Ha Co., Ltd., Dangjin-si, Chungcheongnam-do (KR)

(*) Notice: Subject to any disclaimer, the term of this patent is extended or adjusted under 35 U.S.C. 154(b) by 0 days.

(21) Appl. No.: 16/212,560

(22) Filed: Dec. 6, 2018

(65) Prior Publication Data
US 2019/0185652 A1    Jun. 20, 2019

(30) Foreign Application Priority Data
Dec. 18, 2017    (KR) .................. 10-2017-0174461

(51) Int. Cl.
| | | |
|---|---|---|
| *C08L 23/16* | (2006.01) | |
| *C08L 23/20* | (2006.01) | |
| *C08L 25/08* | (2006.01) | |
| *C08K 5/5415* | (2006.01) | |
| *C08L 23/12* | (2006.01) | |
| *C08L 53/00* | (2006.01) | |
| *C08K 3/34* | (2006.01) | |
| *C08K 7/14* | (2006.01) | |
| *C08K 5/548* | (2006.01) | |
| *C08L 83/04* | (2006.01) | |

(52) U.S. Cl.
CPC ............ *C08L 23/16* (2013.01); *C08K 5/5415* (2013.01); *C08L 23/12* (2013.01); *C08L 23/20* (2013.01); *C08L 25/08* (2013.01); *C08L 53/00* (2013.01); *C08K 3/34* (2013.01); *C08K 5/548* (2013.01); *C08K 7/14* (2013.01); *C08K 2201/003* (2013.01); *C08K 2201/004* (2013.01); *C08K 2201/019* (2013.01); *C08L 83/04* (2013.01); *C08L 2205/035* (2013.01)

(58) Field of Classification Search
CPC combination set(s) only.
See application file for complete search history.

(56) References Cited

U.S. PATENT DOCUMENTS

| | | | |
|---|---|---|---|
| 2004/0067380 A1* | 4/2004 | Maeda | C08K 5/01 428/500 |
| 2007/0155884 A1 | 7/2007 | Pellegatti et al. | |
| 2014/0187694 A1* | 7/2014 | Jang | C08L 23/0815 524/210 |
| 2015/0175790 A1* | 6/2015 | Kim | C08L 23/10 524/451 |
| 2015/0353734 A1* | 12/2015 | Peterle | C08K 5/37 524/506 |

FOREIGN PATENT DOCUMENTS

| KR | 10-2007-0007072 A | 1/2007 |
|---|---|---|
| KR | 10-0762298 B1 | 10/2007 |
| KR | 10-2015-0030834 A | 3/2015 |
| KR | 10-1558703 B1 | 10/2015 |
| KR | 10-1779693 B1 | 9/2017 |

* cited by examiner

*Primary Examiner* — Mark S Kaucher
(74) *Attorney, Agent, or Firm* — Morgan, Lewis & Bockius LLP

(57) ABSTRACT

A polypropylene composite resin composition includes: 30 to 70% by weight of high crystalline block copolymer polypropylene, based on the total weight of the polypropylene composite resin composition; 10 to 20% by weight of a rubber elastomer, based on the total weight of the polypropylene composite resin composition; 10 to 18% by weight of a reinforcing material, based on the total weight of the polypropylene composite resin composition; 2 to 4% by weight of a mercaptosilane coupling agent, based on the total weight of the polypropylene composite resin composition; and 1 to 5% by weight of a slip agent, based on the total weight of the polypropylene composite resin composition.

13 Claims, No Drawings

POLYPROPYLENE COMPOSITE RESIN COMPOSITION HAVING EXCELLENT SCRATCH RESISTANCE AND MECHANICAL PROPERTIES

CROSS-REFERENCE TO RELATED APPLICATION

This application claims, under 35 U.S.C. § 119(a), the benefit of priority to Korean Patent Application No. 10-2017-0174461 filed on Dec. 18, 2017, the entire contents of which are incorporated herein by reference.

TECHNICAL FIELD

The present disclosure relates to a polypropylene composite resin composition with excellent scratch resistance and mechanical properties and an interior material for vehicles including the same.

BACKGROUND

Polypropylene is a general-purpose plastic with excellent chemical resistance and high moldability, but is inapplicable to products requiring excellent mechanical properties or heat resistance due to drawbacks of poor heat resistance and mechanical strength. In order to overcome these drawbacks, technologies of reinforcing polypropylene with various kinds of organic or inorganic substances have been used. In general, mechanical properties of polypropylene resin can be improved by mixing an inorganic substance such as whisker, talc and glass fiber with a polypropylene resin using a mixing device such as an extruder, so that the polypropylene resin can be used for interior or exterior elements for vehicles.

For example, in a related art, glass fiber, whisker, and talc are the most generally used for a main inorganic filler of interior elements for vehicles, and are added to produce polypropylene composite resins. In this regard, as the amount of inorganic filler added increases, physical properties such as heat resistance and flexural modulus are improved, but impact strength and scratch resistance are deteriorated. Accordingly, in conventional attempts to solve these problems, methods of improving impact strength and imparting slip property to a surface to improve scratch resistance through addition of rubber have been used.

However, just adding rubber and imparting slip property to the surface may cause limited mechanical properties and treatment of an excess of a slip agent to satisfy scratch resistance, and lead to structural drawbacks of appearance defects caused by volatilization during high-temperature molding as well as whitening after molding.

When it comes to technologies relating to inorganic fillers, glass fibers have surface unevenness-associated problems including formation of roughness and fiber lifting on the surfaces of molded elements, and limitations of improvement in impact strength. In addition, whisker and talc can exhibit desired mechanical properties, but have a drawback of lack in scratch resistance which is the main requirement of molded elements.

Accordingly, there is an increasing need for polypropylene composite resin compositions that are capable of manufacturing interior materials for vehicles with excellent scratch resistance as well as superior mechanical properties such as impact strength.

The above information disclosed in this Background section is provided only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art.

It is an object of the present disclosure to provide a polypropylene composite resin composition with excellent scratch resistance as well as superior mechanical properties.

The object of the present disclosure is not limited to those described above. The objects of the present disclosure will be clearly understood from the following description and could be implemented by means defined in the claims and a combination thereof.

In one aspect, the present disclosure provides a polypropylene composite resin composition including 30 to 70% by weight of high crystalline block copolymer polypropylene, 10 to 20% by weight of a rubber elastomer, 10 to 18% by weight of a reinforcing material, 2 to 4% by weight of a mercaptosilane coupling agent, and 1 to 5% by weight of a slip agent, based on the total weight of the polypropylene composite resin composition.

The high crystalline block copolymer polypropylene may have a melt index of 30 g/10 min to 80 g/10 min (230° C., 2.16 kg).

The high crystalline block copolymer polypropylene may be a copolymer of ethylene and propylene, wherein an amount of the ethylene is 2 to 10% by weight based on a total weight of the ethylene-propylene copolymer.

The rubber elastomer may be selected from the group consisting of a styrene-ethylene/butene-styrene elastomer, an ethylene-octene elastomer and a combination thereof.

The rubber elastomer may include 5 to 10% by weight of the styrene-ethylene/butene-styrene elastomer, and 5 to 10% by weight of the ethylene-octene elastomer.

The reinforcing material may be selected from the group consisting of glass wool, talc and a combination thereof.

The reinforcing material may include 5 to 9% by weight of glass wool having an acicular shape with a diameter of 3 to 8 μm and a length of 0.3 to 1.0 mm, and 5 to 9% by weight of talc having a sheet shape with an average diameter of 5 μm or less.

The reinforcing material may not include a whisker.

The mercaptosilane coupling agent may be selected from the group consisting of mercaptopropyltrimethoxysilane, mercaptopropyltriethoxysilane, 3-mercaptopropylmethyldimethoxysilane and a combination thereof.

The slip agent may be a siloxane-based slip agent and is a master batch where 50 to 70% by weight of siloxane, based on a total weight of the slip agent, is added to homopolypropylene.

The polypropylene composite resin composition may further include an additive selected from the group consisting of an antioxidant, a UV stabilizer, a lubricant, a release agent, a pigment, an antistatic agent, a processing aid, a compatibilizer and a combination thereof.

In another aspect, the present disclosure provides a molded article including the polypropylene composite resin composition.

The molded article may be an interior material for vehicles, for example, a door trim element.

Other aspects and exemplary embodiments of the invention are discussed infra.

DETAILED DESCRIPTION

The objects described above, and other objects, features and advantages will be clearly understood from the following embodiments. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

It will be understood that, although the terms first, second, etc. may be used herein to describe various elements, these elements should not be limited by these terms and are used only to distinguish one element from another. For example, within the scope defined by the present disclosure, a first element may be referred to as a second element and similarly, a second element may be referred to as a first element. Singular forms are intended to include plural forms as well, unless context clearly indicates otherwise.

It will be further understood that the terms "comprises", "has" and the like, when used in this specification, specify the presence of stated features, number, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" modifies all the numbers, figures and/or expressions. In addition, when numerical ranges are disclosed in the description, these numerical ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The polypropylene composite resin composition according to the present disclosure includes 30 to 70% by weight of high crystalline block copolymer polypropylene, 10 to 20% by weight of a rubber elastomer, 10 to 18% by weight of a reinforcing material, 2 to 4% by weight of a mercaptosilane coupling agent and 1 to 5% by weight of a slip agent.

The content of each ingredient of the polypropylene composite resin composition which will be described later is based on 100% by weight of the polypropylene composite resin composition. When the basis of the content is changed, the changed basis will be clearly mentioned. Accordingly, those having ordinary knowledge would appreciate what the basis of the content is.

(1) High Crystalline Block Copolymer Polypropylene (HCPP)

The high crystalline block copolymer polypropylene is a main ingredient of the polypropylene composite resin composition according to the present disclosure and may be present in an amount of 30 to 70% by weight. When the content of HCPP is less than 30% by weight, overall mechanical properties are deteriorated and when the content exceeds 70% by weight, impact strength is deteriorated.

The high crystalline block copolymer polypropylene may have a melt index of 30 g/10 min to 80 g/10 min (230° C., 2.16 kg load conditions). When the melt index is less than 30 g/10 min (230° C., 2.16 kg), molding workability is deteriorated, and when the melt index exceeds 80 g/10 min (230° C., 2.16 kg), mechanical properties such as impact strength and rigidity (flexural modulus) are deteriorated.

The high crystalline block copolymer polypropylene may be an ethylene-propylene copolymer and may include 2 to 10% by weight of ethylene with respect to the total weight of the ethylene-propylene copolymer. When the content of ethylene is less than 2% by weight, impact strength is deteriorated, and when the content exceeds 10% by weight, impact strength is improved, but rigidity is deteriorated.

(2) Rubber Elastomer

The rubber elastomer is an element to improve impact strength or the like, may be a rubber-ingredient elastomer, specifically, selected from the group consisting of a styrene-ethylene/butene-styrene elastomer, an ethylene-octene elastomer and a combination thereof and may be present in an amount of 10 to 20% by weight. When the content of the rubber elastomer is less than 10% by weight, impact strength is deteriorated and, when the content exceeds 20% by weight, rigidity is deteriorated.

More specifically, the rubber elastomer may include 5 to 10% by weight of the styrene-ethylene/butene-styrene elastomer and 5 to 10% by weight of the ethylene-octene elastomer. When the contents of the styrene-ethylene/butene-styrene elastomer and the ethylene-octene elastomer are each less than 5% by weight, impact strength is deteriorated and when the contents thereof exceed 10% by weight, rigidity is deteriorated.

The styrene-ethylene/butene-styrene elastomer may contain styrene in an amount of 10 to 15% by weight (based on the weight of the styrene-ethylene/butene-styrene elastomer) and a melt index of 20 g/10 min to 30 g/10 min (230° C., 2.16 kg).

The ethylene-octene elastomer may have a melt index of 20 g/10 min to 30 g/10 min (230° C., 2.16 kg).

(3) Reinforcing Material

The reinforcing material is an element to improve rigidity, molding workability and the like, is selected from the group consisting of glass wool, talc and a combination thereof and may be present in an amount of 10 to 18% by weight. When the content of the reinforcing material is less than 10% by weight, rigidity and dimensional stability are deteriorated, and when the content of reinforcing material exceeds 18% by weight, it is unsuitable for weight reduction due to increased weight of products, and scratch resistance is deteriorated due to excessive surface roughness.

More specifically, the reinforcing material may include 5 to 9% by weight of glass wool with a certain size and shape and 5 to 9% by weight of talc with a certain size and shape. When the content of the glass wool is less than 5% by weight and the content of talc is higher than 9% by weight, scratch resistance and rigidity are deteriorated, and when the content of glass wool is higher than 9% by weight and the content of talc is less than 5% by weight, rigidity and impact strength are deteriorated.

The glass wool may take an acicular shape with a diameter of 3 to 8 μm and a length of 0.3 to 1.0 mm. When the length of the glass wool is less than 0.3 mm, impact strength and rigidity are deteriorated, and when the length is higher than 1.0 mm, impact strength and rigidity are deteriorated, and the results of side impact test upon application to an element such as a door trim are not satisfactory.

The talc may take a sheet shape with an average diameter of 5 μm or less, more particularly, 3 to 5 μm.

Meanwhile, the reinforcing material may not include whisker. When the reinforcing material includes whisker, scratch resistance and IZOD impact strength are deteriorated due to the acicular structure and whitening degree, results of side impact testing upon application to an element such as a door trim are not satisfactory.

(4) Coupling Agent

The coupling agent is an element which can improve the interfacial adhesion between the polymer material and the reinforcing material, and thereby enhance mechanical properties such as impact strength and rigidity, and scratch resistance of the composite resin composition. In particular, the coupling agent may be a mercaptosilane coupling agent and is present in an amount of 2 to 4% by weight because mechanical properties such as impact strength and rigidity, and scratch resistance can be improved in balance.

The mercaptosilane coupling agent may be selected from the group consisting of mercaptopropyltrimethoxysilane, mercaptopropyltriethoxysilane, 3-mercaptopropylmethyldimethoxysilane and a combination thereof.

According to the present disclosure, the coupling agent may be a mercaptosilane coupling agent as the silane-based coupling agent, because results of side impact test upon application to an element such as a door trim are unsatisfactory, when a different kind of silane-based coupling agent such as an amino-based coupling agent is used.

(5) Slip Agent

The slip agent is an element to improve scratch resistance by imparting slip to the surface, is a siloxane-based slip agent and may be present in an amount of 1 to 5% by weight. When the content of slip agent is less than 1% by weight, the effect caused by addition of the slip agent is insignificant, and when the content is higher than 5% by weight, compatibility between the respective elements of the polypropylene composite resin composition is suppressed.

The siloxane-based slip agent may be a master batch where 50 to 70% by weight of siloxane, based on the total weight of the slip agent, is added to homopolypropylene. The "master batch" may include homopolypropylene as a base resin and is obtained by adding the aforementioned amount of a ultrahigh molecular silicone polymer such as siloxane to the homopolypropylene and homogeneously mixing the same.

(6) Additive

The additive is an element to impart a variety of functions to the polypropylene composite resin composition, is selected from the group consisting of antioxidants, UV stabilizers, lubricants, release agents, pigments, antistatic agents, processing aids, compatibilizers and combinations thereof, and the content thereof is not particularly limited and may be 1 to 3% by weight.

In another aspect, the present disclosure is related to a molded article including the polypropylene composite resin composition.

The molded article may be obtained by molding the polypropylene composite resin composition by a method such as extrusion molding, injection molding, compression molding, foaming injection molding, foaming low-pressure injection molding, or gas compression molding.

In addition, the molded article may be used in any field without limitation and may be used for interior materials for vehicles, for example, door trim elements or the like.

Hereinafter, the present disclosure will be described in more detail with reference to specific examples. These examples are provided only for illustration to help the understanding of the present disclosure and should be not construed as limiting the scope of the present disclosure.

EXAMPLE AND COMPARATIVE EXAMPLE

Polypropylene composite resin compositions were prepared in accordance with the compositions and contents shown in the following Table 1.

TABLE 1

| | | Examples | | | Comparative Examples | | | | | | | | | | | | | | | |
|---|---|---|---|---|---|---|---|---|---|---|---|---|---|---|---|---|---|---|---|---|
| Items | | 1 | 2 | 3 | 1 | 2 | 3 | 4 | 5 | 6 | 7 | 8 | 9 | 10 | 11 | 12 | 13 | 14 | 15 | 16 | 17 |
| Polypropelene | HCPP[1)] | 64 | 63 | 62 | 66 | 65 | 61 | 64 | 64 | 64 | 70 | 54 | 58 | 58 | 25 | 40 | 50 | 60 | 64 | 64 | 64 |
| | Co-PP[2)] | | | | | | | | | | | | | | 39 | 24 | 14 | 4 | | | |
| Rubber | SEBS[3)] | 7 | 7 | 7 | 7 | 7 | 7 | 7 | 7 | 7 | 4 | 12 | | 20 | 7 | 7 | 7 | 7 | 7 | 7 | 7 |
| elastomer | EOR[4] | 7 | 7 | 7 | 7 | 7 | 7 | 7 | 7 | 7 | 4 | 12 | 20 | | 7 | 7 | 7 | 7 | 7 | 7 | 7 |
| Reinforcing | Talc | 7 | 7 | 7 | 7 | 7 | 7 | 7 | 7 | 7 | 7 | 7 | 7 | 7 | 7 | 7 | 7 | 7 | 4 | 10 | 7 |
| material | Whisker | | | | | | | | | | | | | | | | | | | | 7 |
| | Glass 0.1 mm | | | | | | | | 7 | | | | | | | | | | | | |
| | wool 0.5 mm | 7 | 7 | 7 | 7 | 7 | 7 | 7 | | | 7 | 7 | 7 | 7 | 7 | 7 | 7 | 7 | 7 | 10 | 4 |
| | (fiber 1.2 mm | | | | | | | | | 7 | | | | | | | | | | | |
| | length) | | | | | | | | | | | | | | | | | | | | |

TABLE 1-continued

|  | Items | Examples | | | Comparative Examples | | | | | | | | | | | | | | | |
|---|---|---|---|---|---|---|---|---|---|---|---|---|---|---|---|---|---|---|---|---|
|  |  | 1 | 2 | 3 | 1 | 2 | 3 | 4 | 5 | 6 | 7 | 8 | 9 | 10 | 11 | 12 | 13 | 14 | 15 | 16 | 17 |
| Coupling agent | Aminosilane[5] |  |  |  |  |  |  | 2 |  |  |  |  |  |  |  |  |  |  |  |  |  |
|  | Merocaptosilane[6] | 2 | 3 | 4 |  | 1 | 5 |  | 2 | 2 | 2 | 2 | 2 | 2 | 2 | 2 | 2 | 2 | 2 | 2 | 2 |
|  | Slip agent[7] | 4 | 4 | 4 | 4 | 4 | 4 | 4 | 4 | 4 | 4 | 4 | 4 | 4 | 4 | 4 | 4 | 4 | 4 | 4 |
|  | Additive[8] | 2 | 2 | 2 | 2 | 2 | 2 | 2 | 2 | 2 | 2 | 2 | 2 | 2 | 2 | 2 | 2 | 2 | 2 | 2 |

[1] HCPP: high crystalline block copolymer polypropylene with a melt index of 30 g/10 min to 80 g/10 min (230° C., 2.16 kg) (CB5230, CB5260, Korea Petrochemical Ind. Co., LTD)
[2] Co-PP: block copolymer polypropylene with a melt index of 35 g/10 min to 50 g/10 min (230° C., 2.16 kg) (EP5077, Polymirae Company LTD)
[3] SEBS: styrene-ethylene/butadiene-styrene elastomer with a styrene content of 13% and a melt index of 22 g/10 min (230° C., 2.16 kg) (G1657, Kraton)
[4] EOR: ethylene-octene elastomer with a melt index of 30 g/10 min (EG8407, DOW)
[5] Aminosilane: 3-aminopropyltriethoxysilane (JH-A110, JHSi)
[6] Mercaptosilane: 3-mercaptopropyltrimethoxysilane (JH-S189, JHSi)
[7] Slip agent: master batch where 50% of siloxane is added to homopolypropylene (MB50-001, DOW CORNING)
[8] Additive: UV stabilizer, heat stabilizer, dispersant, lubricant and pigment Test Example (1) Test Items For the polypropylene composite resin compositions according to Examples and Comparative Examples, physical properties of items shown in the following Table 2 were tested. Required physical properties of Table 2 mean physical properties required when used as an interior material for vehicles.

TABLE 2

| | Classification | | |
|---|---|---|---|
| Items | Certified standard | Required properties | Unit |
| MI | ASTM D1238 | 20 or more | g/10 min |
| Specific gravity | ASTM D792 | 0.97 ± 0.02 | — |
| Tensile strength | ASTM D638 | 21 or more | MPa |
| Elongation | ASTM D638 | 50 or more | % |
| Flexural strength | ASTM D790 | 33 or more | MPa |
| Flexural modulus | ASTM D790 | 2100 or more | MPa |
| Impact strength | ASTM D256 Notched, 2.94J | 400 or more | KJ/m² |
| Heat deflection temperature | ASTM D648 Edge | 120 or more | ° C. |
| Scratch resistance | MS 210-05 | 0.7 or less | ΔL |
| Side impact | ES I, ES II | — | — |

(2) Measurement Method

Specimens were manufactured by injection-molding the polypropylene composite resin compositions according to Examples 1 to 3 and Comparative Examples 1 to 17 using a Niigata 180 ton electric injection molding machine. The injection temperatures were 180° C./210° C./220° C./220° C. in this order from the feeding hopper part to the nozzle and the injection pressure was 30 to 100 MPa.

Physical properties were measured using the specimens in accordance with the following method.

Melt index (MI): measured at 230° C. on a load of 21.2N in accordance with ASTM D1238.

Specific gravity: measured in accordance with ASTM D792.

Tensile strength and elongation: measured at a test speed of 50 mm/min at room temperature in accordance with ASTM D638.

Flexural modulus: measured at a test speed of 30 mm/min at room temperature in accordance with ASTM D790.

IZOD impact strength: measured at room temperature with a notched processing specimen in accordance with ASTM D256.

Heat deflection temperature: measured at a stress load of 0.45 MPa in accordance with ASTM D648.

Scratch resistance test: tested in width/length 20 times at an interval of 2 mm at a load of 10N and at a scratch speed of 1,000 mm/min using an Erichsen tester in accordance with MS210-05, and measured using a BYK colorimeter. At this time, HL-225 was used as an embossed specimen.

Side impact test: crash test was conducted in accordance with ES-I and ES-II.

(3) Results

The test results of the polypropylene composite resin compositions according to Examples and Comparative Examples are shown in the following Table 3.

TABLE 3

| Classification | Examples | | | Comparative Examples | | | | | | |
|---|---|---|---|---|---|---|---|---|---|---|
| Items | 1 | 2 | 3 | 1 | 2 | 3 | 4 | 5 | 6 | 7 |
| MI | 26 | 26 | 27 | 26 | 27 | 27 | 26 | 26 | 27 | 28 |
| Specific gravity | 0.98 | 0.98 | 0.98 | 0.98 | 0.98 | 0.98 | 0.98 | 0.98 | 0.98 | 0.98 |
| Tensile strength | 22 | 22 | 22 | 22 | 20 | 20 | 22 | 22 | 23 | 24 |
| Elongation | 108 | 117 | 121 | 74 | 93 | 93 | 88 | 77 | 62 | 42 |
| Flexural strength | 36 | 36 | 37 | 35 | 33 | 33 | 36 | 35 | 37 | 38 |
| Flexural modulus | 2320 | 2350 | 2390 | 1935 | 1730 | 1810 | 1934 | 1850 | 2065 | 2290 |
| Impact strength | 408 | 419 | 427 | 363 | 375 | 392 | 353 | 361 | 236 | 169 |

TABLE 3-continued

| Classification | | | | | | | | | | |
|---|---|---|---|---|---|---|---|---|---|---|
| Heat deflection temperature | 125 | 123 | 123 | 126 | 118 | 118 | 122 | 125 | 125 | 128 |
| Scratch resistance | 0.28 | 0.25 | 0.17 | 0.29 | 0.34 | 0.34 | 0.38 | 0.35 | 0.24 | 0.37 |
| Gloss | 1.8 | 1.8 | 1.8 | 1.8 | 1.8 | 1.8 | 1.8 | 1.8 | 1.8 | 1.9 |
| Side impact | Pass | Pass | Pass | Pass | Pass | Pass | Fail | Pass | Fail | Fail |

| Classification | Comparative Examples | | | | | | | | | |
|---|---|---|---|---|---|---|---|---|---|---|
| Items | 8 | 9 | 10 | 11 | 12 | 13 | 14 | 15 | 16 | 17 |
| MI | 25 | 29 | 25 | 30 | 28 | 27 | 26 | 26 | 26 | 27 |
| Specific gravity | 0.98 | 0.98 | 0.98 | 0.98 | 0.98 | 0.98 | 0.98 | 0.98 | 0.98 | 0.98 |
| Tensile strength | 18 | 19 | 19 | 19 | 20 | 21 | 22 | 22 | 21 | 23 |
| Elongation | 156 | 121 | 103 | 121 | 74 | 93 | 88 | 77 | 68 | 62 |
| Flexural strength | 31 | 32 | 32 | 32 | 33 | 34 | 35 | 35 | 35 | 37 |
| Flexural modulus | 1620 | 1790 | 1830 | 1760 | 1835 | 1980 | 2272 | 2087 | 2013 | 2695 |
| Impact strength | N.B | N.B | N.B | 427 | 363 | 382 | 413 | 348 | 409 | 345 |
| Heat deflection temperature | 113 | 118 | 115 | 117 | 118 | 119 | 121 | 125 | 122 | 124 |
| Scratch resistance | 0.34 | 0.33 | 0.32 | 0.58 | 0.49 | 0.41 | 0.37 | 0.35 | 1.21 | 2.52 |
| Gloss | 1.7 | 1.7 | 1.6 | 1.6 | 1.7 | 1.7 | 1.8 | 1.8 | 1.8 | 1.8 |
| Side impact | Pass | Pass | Pass | Pass | Pass | Pass | Pass | Pass | Pass | Fail |

As can be seen from Table 3, the specimens produced from the polypropylene composite resin compositions Examples 1 to 3 exhibit i) impact strength of 400 J/m or more and thus satisfy crash performance required for interior materials for vehicles, ii) exhibit a flexural modulus (rigidity) of 2,100 MPa or more and thus satisfy strain and rigidity caused by load required for interior materials for vehicles, and exhibit iii) excellent scratch resistance (ΔL=1.2 or less) of 0.5 or less and superior appearance.

On the other hand, Comparative Examples 1 and 2 (wherein the content of a mercaptosilane coupling agent content is less than 2% by weight) have a flexural modulus of less than 2,100 MPa and impact strength of less than 400 J/m, and thus exhibit unsatisfactory results.

Comparative Example 3 (wherein the content of the mercaptosilane coupling agent is higher than 4% by weight) has a flexural modulus of less than 2,100 MPa and impact strength of less than 400 J/m and thus exhibits unsatisfactory results.

Comparative Example 4 (including an aminosilane-based coupling agent, instead of the mercaptosilane coupling agent) not only exhibits unsatisfactory flexural modulus and impact strength, but also fails the side impact test.

Comparative Example 5 (wherein the length of glass wool is less than 0.3 mm) exhibits significantly deteriorated flexural modulus and unsatisfactory impact strength.

Comparative Example 6 (wherein the length of glass wool is higher than 1.0 mm) exhibits significantly deteriorated impact strength and unsatisfactory flexural modulus and fails the side impact test.

Comparative Example 7 (where contents of SEBS and EOR constituting the rubber elastomer are each less than 5% by weight) exhibits significantly deteriorated elongation and impact strength, and fails the side impact test.

Comparative Example 8 (where contents of SEBS and EOR constituting the rubber elastomer are each higher than 10% by weight) exhibits deteriorated tensile strength and flexural strength, in particular, significantly deteriorated flexural modulus.

Comparative Example 9 (wherein the rubber elastomer includes only EOR) and Comparative Example 10 (where the rubber elastomer includes only SEBS) exhibit deteriorated tensile strength and flexural strength, in particular, significantly deteriorated flexural modulus.

Comparative Example 11 (where the content of high crystalline block copolymer polypropylene is less than 30% by weight) exhibits deterioration in overall mechanical properties, that is, tensile strength, flexural strength and flexural modulus.

Comparative Examples 12 to 13 (where a great amount of block copolymer polypropylene, instead of high crystalline block copolymer polypropylene, is added) exhibit deterioration in flexural modulus and impact strength.

Comparative Example 15 (wherein the reinforcing material includes less than 5% by weight of talc and greater than 9% by weight of glass wool) exhibits slight deterioration in flexural modulus and significant deterioration in impact strength.

Comparative Example 16 (wherein the reinforcing material includes higher than 9% by weight of talc and less than 5% by weight of glass wool) exhibits slight deterioration in flexural modulus and deterioration in scratch resistance.

Comparative Example 17 (wherein the reinforcing material is whisker) exhibits significantly deteriorated impact strength and scratch resistance.

According to the present disclosure, interior materials for vehicles with excellent impact resistance, high rigidity and superior scratch resistance can be obtained by using the polypropylene composite resin composition according to the present disclosure.

Other effects of the invention are discussed infra.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene composite resin composition comprising:
- 30 to 70% by weight of high crystalline block copolymer polypropylene, based on the total weight of the polypropylene composite resin composition;
- 10 to 20% by weight of a rubber elastomer, based on the total weight of the polypropylene composite resin composition;
- 10 to 18% by weight of a reinforcing material, based on the total weight of the polypropylene composite resin composition;
- 2 to 4% by weight of a mercaptosilane coupling agent, based on the total weight of the polypropylene composite resin composition; and
- 1 to 5% by weight of a slip agent, based on the total weight of the polypropylene composite resin composition, wherein the reinforcing material comprises:
- 5 to 9% by weight of glass wool having an acicular shape with a diameter of 3 to 8 µm and a length of 0.3 to 1.0 mm, based on the total weight of the polypropylene composite resin composition, and
- 5 to 9% by weight of talc having a sheet shape with an average diameter of 5 µm or less, based on the total weight of the polypropylene composite resin composition.

2. The polypropylene composite resin composition according to claim 1, wherein the high crystalline block copolymer polypropylene has a melt index of 30 g/10 min to 80 g/10 min (230° C., 2.16 kg).

3. The polypropylene composite resin composition according to claim 1, wherein the high crystalline block copolymer polypropylene is a copolymer of ethylene and propylene, wherein an amount of the ethylene is 2 to 10% by weight based on the total weight of the ethylene-propylene copolymer.

4. The polypropylene composite resin composition according to claim 1, wherein the rubber elastomer is selected from the group consisting of a styrene-ethylene/butene-styrene elastomer, an ethylene-octene elastomer, and a combination thereof.

5. The polypropylene composite resin composition according to claim 1, wherein the rubber elastomer comprises:
- 5 to 10% by weight of the styrene-ethylene/butene-styrene elastomer, based on the total weight of the polypropylene composite resin composition; and
- 5 to 10% by weight of the ethylene-octene elastomer, based on the total weight of the polypropylene composite resin composition.

6. The polypropylene composite resin composition according to claim 1, wherein the reinforcing material is selected from the group consisting of glass wool, talc, and a combination thereof.

7. The polypropylene composite resin composition according to claim 1, wherein the reinforcing material does not include a whisker.

8. The polypropylene composite resin composition according to claim 1, wherein the mercaptosilane coupling agent is selected from the group consisting of mercaptopropyltrimethoxysilane, mercaptopropyltriethoxysilane, 3-mercaptopropylmethyldimethoxysilane and a combination thereof.

9. The polypropylene composite resin composition according to claim 1, wherein the slip agent is a siloxane-based slip agent and is a master batch where 50 to 70% by weight of siloxane, based on the total weight of the slip agent, is added to homopolypropylene.

10. The polypropylene composite resin composition according to claim 1, further comprising:
an additive selected from the group consisting of an antioxidant, a UV stabilizer, a lubricant, a release agent, a pigment, an antistatic agent, a processing aid, a compatibilizer, and a combination thereof.

11. A molded article comprising the polypropylene composite resin composition according to claim 1.

12. The molded article according to claim 11, wherein the molded article is an interior material for vehicles.

13. The molded article according to claim 11, wherein the molded article is a door trim element.

* * * * *